(12) United States Patent
Larson

(10) Patent No.: US 10,932,413 B1
(45) Date of Patent: Mar. 2, 2021

(54) HITCH MOUNTED FORKLIFT ASSEMBLY

(71) Applicant: Mark Larson, Monticello, MN (US)

(72) Inventor: Mark Larson, Monticello, MN (US)

( * ) Notice: Subject to any disclaimer, the term of this patent is extended or adjusted under 35 U.S.C. 154(b) by 0 days.

(21) Appl. No.: 16/793,004

(22) Filed: Feb. 18, 2020

(51) Int. Cl.
| *A01D 87/12* | (2006.01) |
| *A01B 59/042* | (2006.01) |
| *B60R 9/06* | (2006.01) |
| *B66F 9/20* | (2006.01) |
| *B66F 9/18* | (2006.01) |
| *B60R 11/00* | (2006.01) |

(52) U.S. Cl.
CPC .......... *A01D 87/122* (2013.01); *A01B 59/042* (2013.01); *B60R 9/06* (2013.01); *B66F 9/18* (2013.01); *B66F 9/20* (2013.01); *B60R 2011/004* (2013.01); *B60R 2011/0052* (2013.01); *B66F 2700/03* (2013.01)

(58) Field of Classification Search
CPC .. B60P 1/4421; B60R 9/06; B66F 9/12; B66F 9/19; B60D 1/46; B60D 1/465
See application file for complete search history.

(56) References Cited

U.S. PATENT DOCUMENTS

| 306,993 | A | * | 10/1884 | Armentrout | B66F 9/19 414/647 |
| 2,904,201 | A | * | 9/1959 | Rhodes | B62B 1/14 414/467 |
| 2,949,197 | A | * | 8/1960 | Lomen | B60P 1/4421 414/545 |
| 3,708,183 | A | * | 1/1973 | Jones | B60D 1/50 280/483 |
| 3,865,406 | A | * | 2/1975 | Dutton | B60D 1/46 280/490.1 |
| 4,264,252 | A | * | 4/1981 | Jennings | B66F 9/18 414/24.5 |
| 4,588,048 | A | * | 5/1986 | Rodriguez | B66F 7/28 187/213 |
| 4,940,096 | A | | 7/1990 | Johnson | |
| 5,178,505 | A | | 1/1993 | Smith | |
| 5,413,366 | A | * | 5/1995 | Gibbons | B60D 1/46 280/490.1 |
| 5,603,597 | A | | 2/1997 | Clay, Sr. | |
| D379,997 | S | | 6/1997 | Bailey | |
| 6,575,488 | B2 | * | 6/2003 | Massey | B60D 1/46 280/490.1 |
| 6,840,730 | B2 | | 1/2005 | Noualy | |
| 8,087,866 | B2 | | 1/2012 | Fast | |
| 8,132,997 | B2 | * | 3/2012 | Reuille | B60P 1/4421 414/462 |

(Continued)

*Primary Examiner* — Gregory W Adams

(57) ABSTRACT

A hitch mounted forklift assembly includes a primary member that is insertable into a hitch receiver of a truck. A coupler is coupled to the primary member and the coupler is exposed when the primary member is positioned in the tow hitch. A lifting rail is provided that has a track gear integrated therein and a motor is coupled to the primary member. A drive gear is rotatably coupled to the motor and the drive gear engages the track gear in the lifting rail. The lifting rail is lifted upwardly or lowered downwardly by the drive gear when the motor rotates the drive gear. A cross member is coupled to the lifting rail and a plurality of tines is each from the cross member. The plurality of tines lifts and lowers a hay bale for transport.

7 Claims, 6 Drawing Sheets

(56) References Cited

U.S. PATENT DOCUMENTS

| | | | |
|---|---|---|---|
| 8,678,737 B2 * | 3/2014 | DiGiovanni | A61G 3/062 414/462 |
| 2007/0280807 A1 * | 12/2007 | Threet | B60P 3/122 414/462 |
| 2009/0028679 A1 * | 1/2009 | Smith | B60R 9/06 414/462 |
| 2010/0221092 A1 | 9/2010 | Currie | |

* cited by examiner

HITCH MOUNTED FORKLIFT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to forklift devices and more particularly pertains to a new forklift device for mounting a forklift to a hitch receiver on a truck.

(2) Description of Related Art Including Information Disclosed Under 37 CFR 1.97 and 1.98

The prior art relates to forklift devices. The prior art discloses a forklift that is mounted to the rear of a pickup truck which includes a piston for lifting or lowering a hay bale. The prior art discloses a variety of three point hitches that are attachable to a rear of a vehicle for lifting or lowering a hale bale. In each case the three point hitch includes a hydraulic actuator. The prior art discloses a hay bale lifter that is insertable into a hitch receiver of a truck that includes a ratchet binder for manually lifting or lowering a hay bale.

BRIEF SUMMARY OF THE INVENTION

An embodiment of the disclosure meets the needs presented above by generally comprising a primary member that is insertable into a hitch receiver of a truck. A coupler is coupled to the primary member and the coupler is exposed when the primary member is positioned in the tow hitch. A lifting rail is provided that has a track gear integrated therein and a motor is coupled to the primary member. A drive gear is rotatably coupled to the motor and the drive gear engages the track gear in the lifting rail. The lifting rail is lifted upwardly or lowered downwardly by the drive gear when the motor rotates the drive gear. A cross member is coupled to the lifting rail and a plurality of tines is each from the cross member. The plurality of tines lifts and lowers a hay bale for transport.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
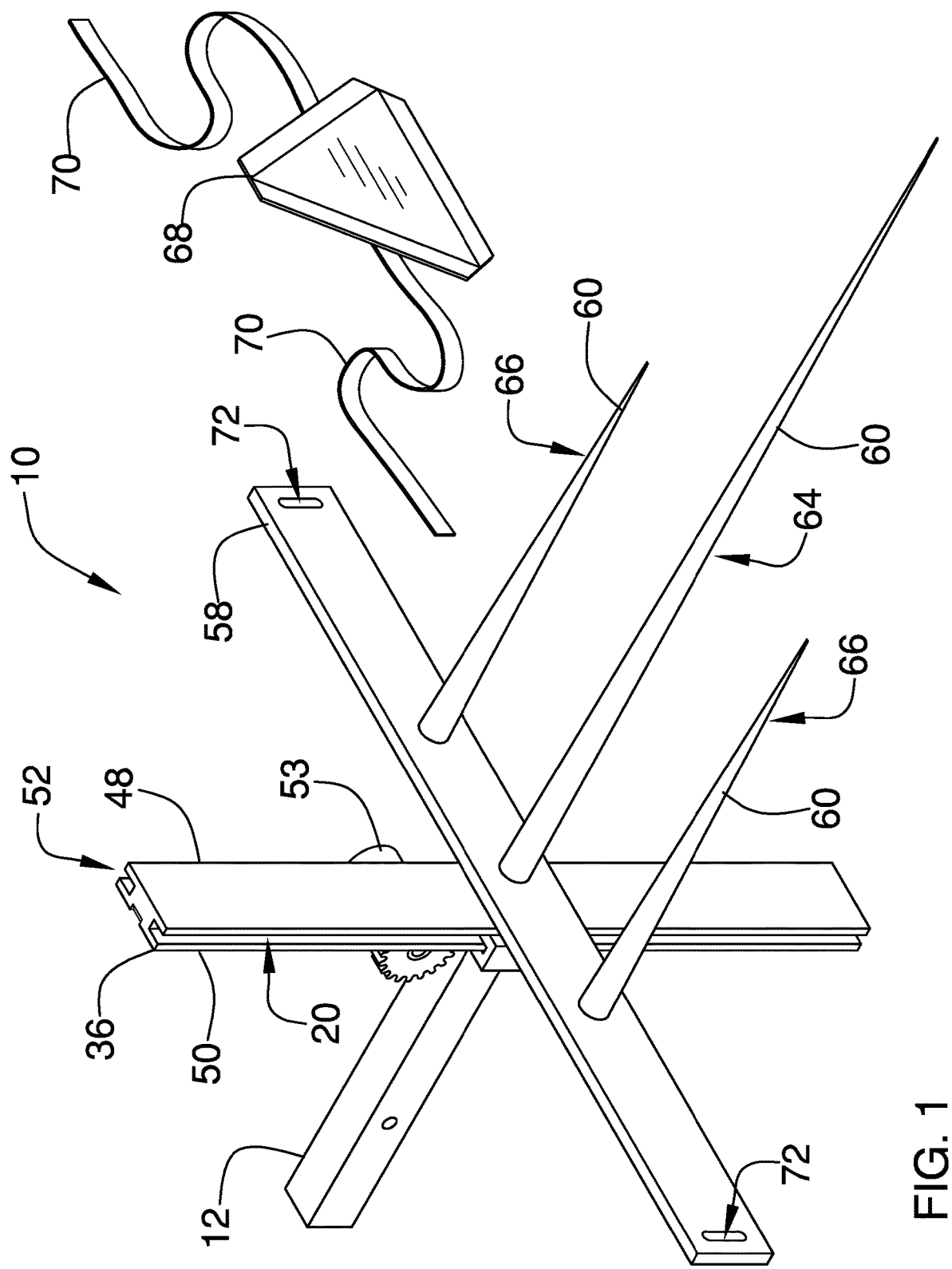
FIG. 1 is a front perspective view of a hitch mounted forklift assembly according to an embodiment of the disclosure.
Figure 2:
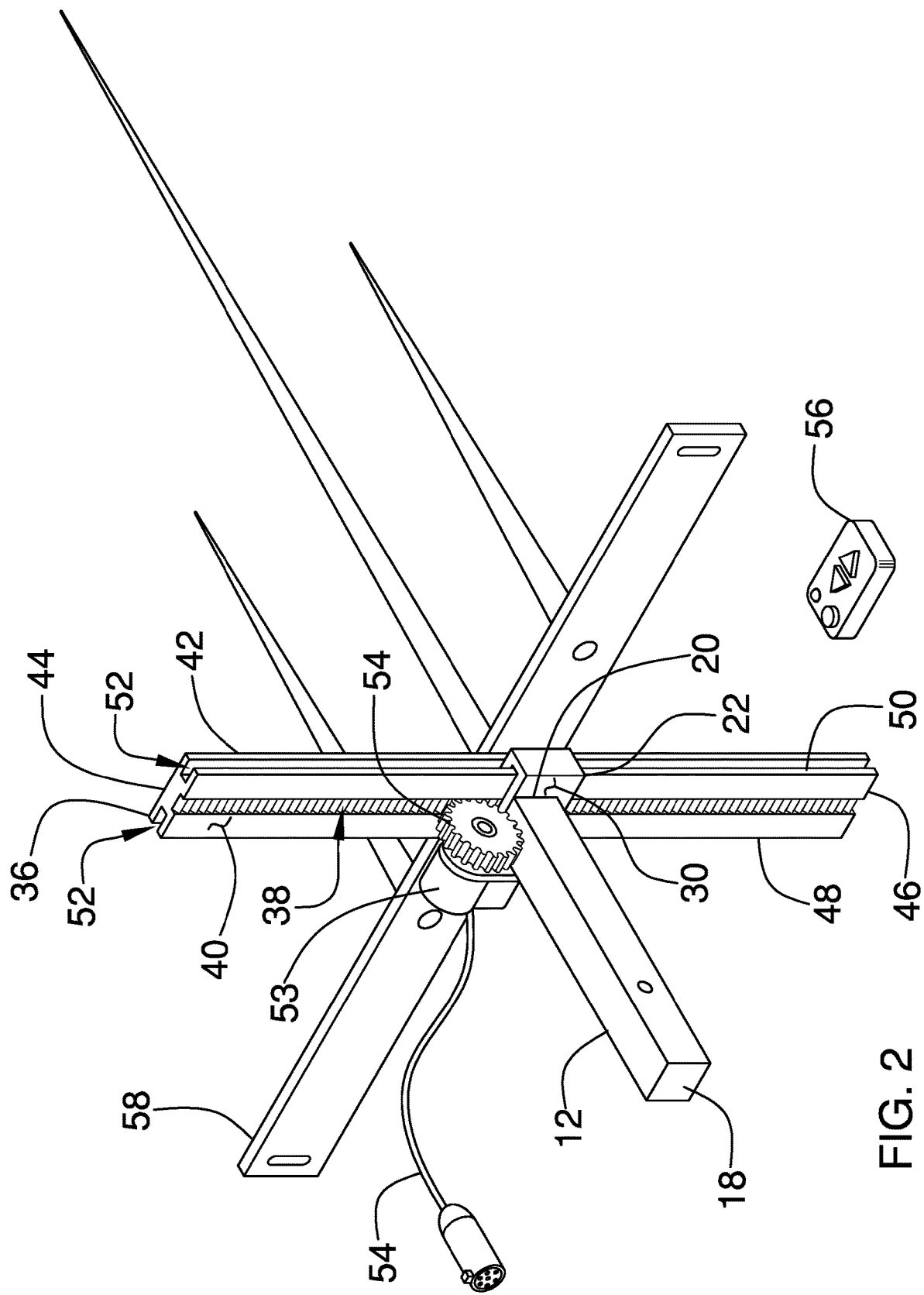
FIG. 2 is a back perspective view of an embodiment of the disclosure.
Figure 3:
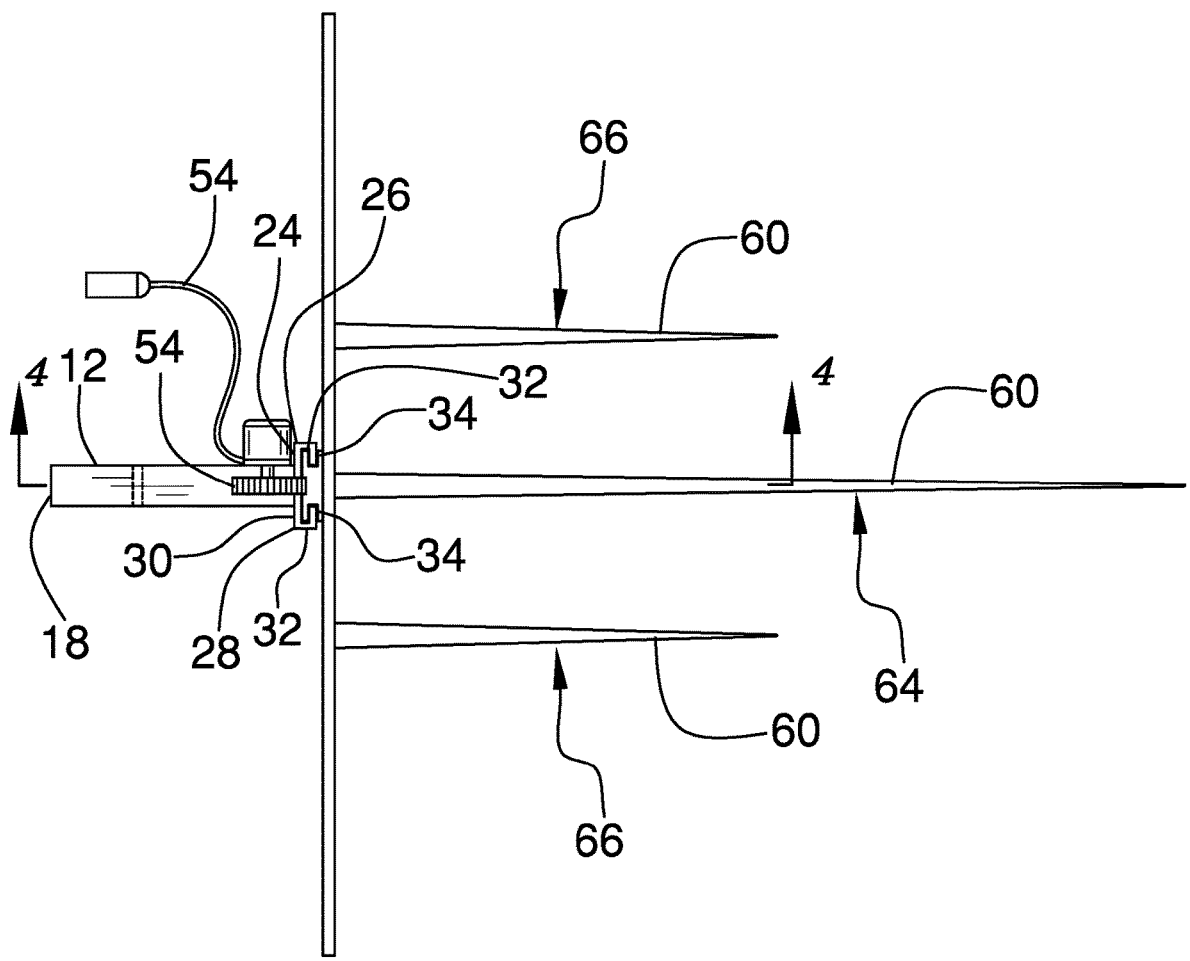
FIG. 3 is a top view of an embodiment of the disclosure.
Figure 4:
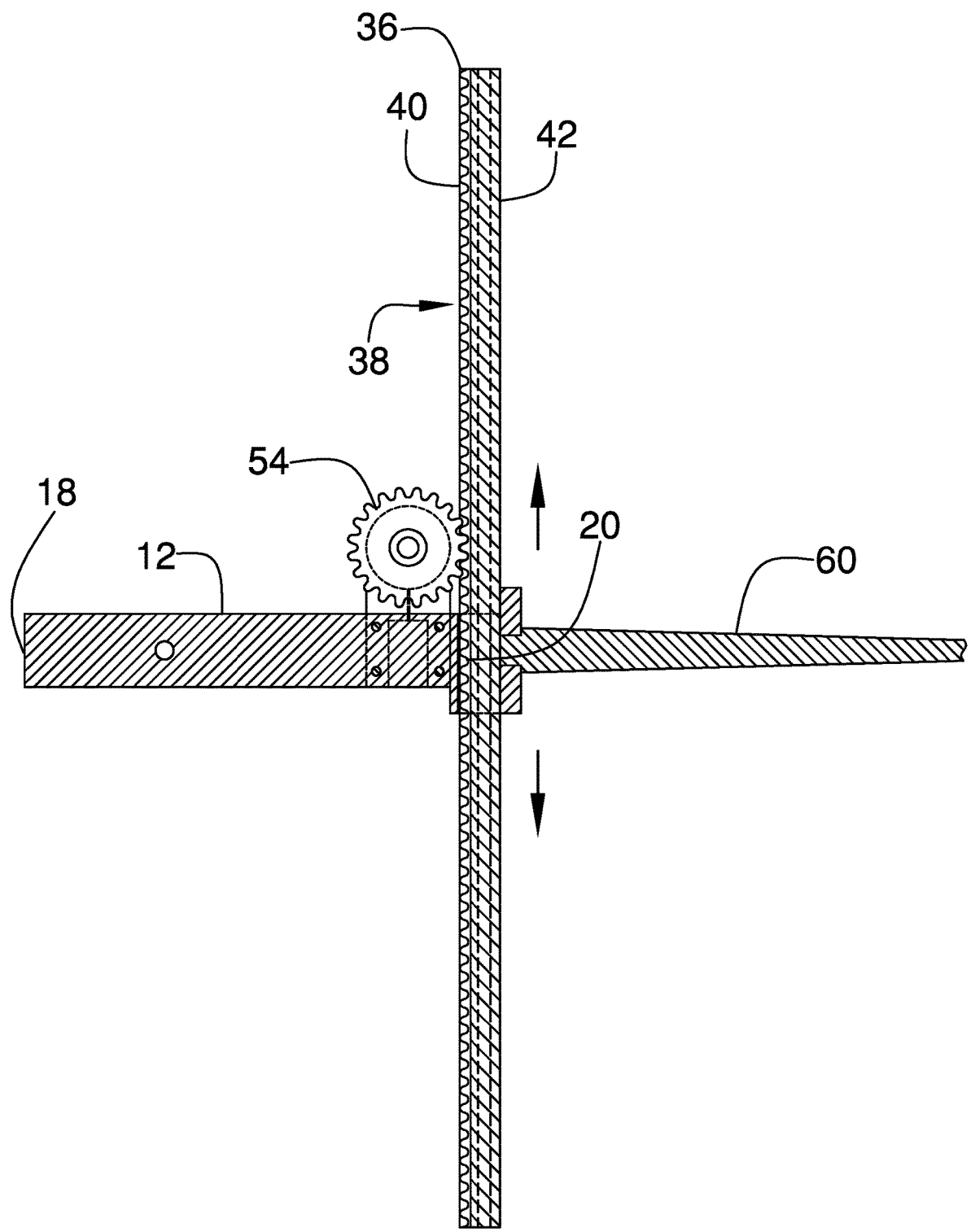
FIG. 4 is a cross sectional view taken along line 4-4 of FIG. 3 of an embodiment of the disclosure.
Figure 5:
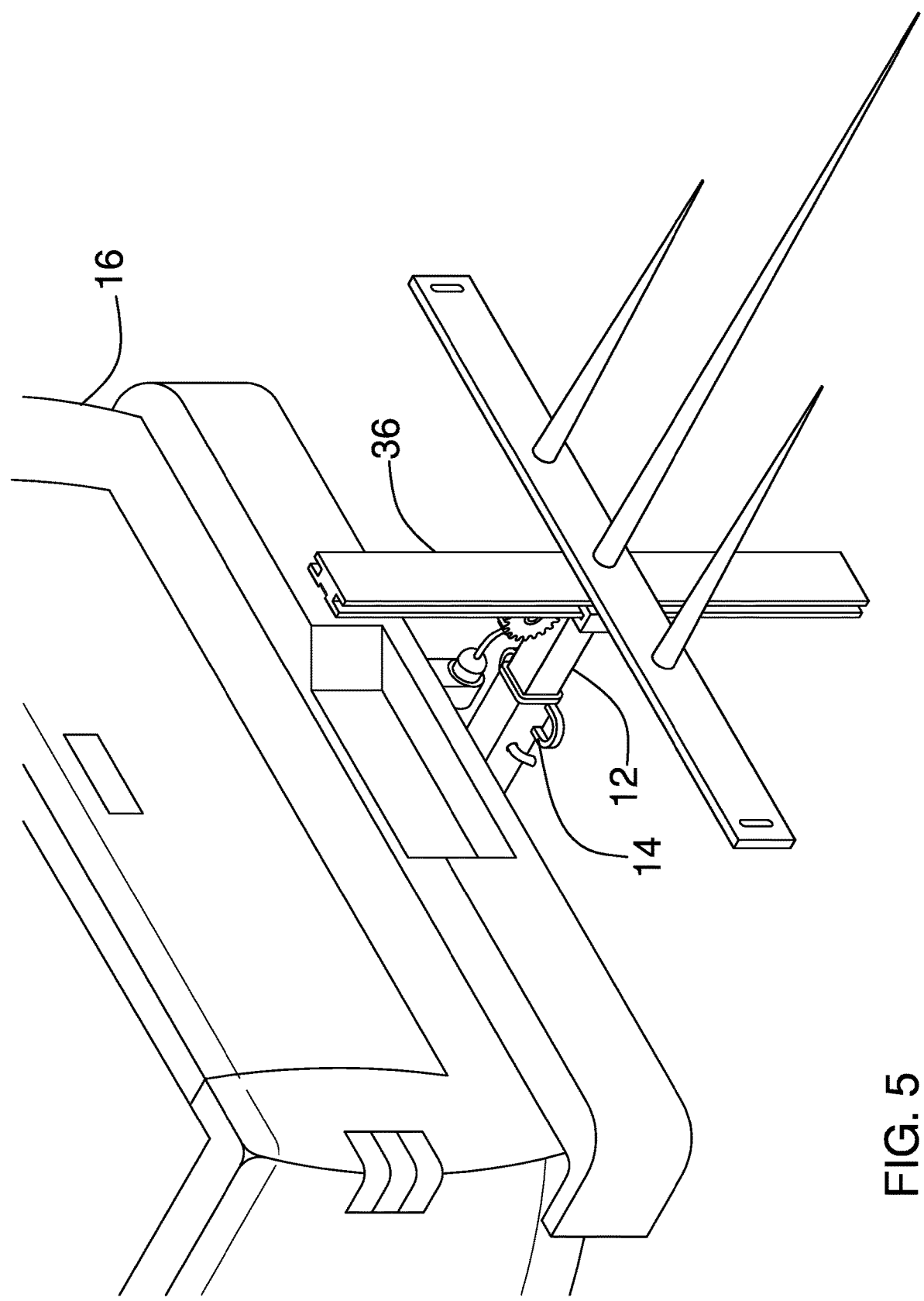
FIG. 5 is a perspective in-use view of an embodiment of the disclosure.
Figure 6:
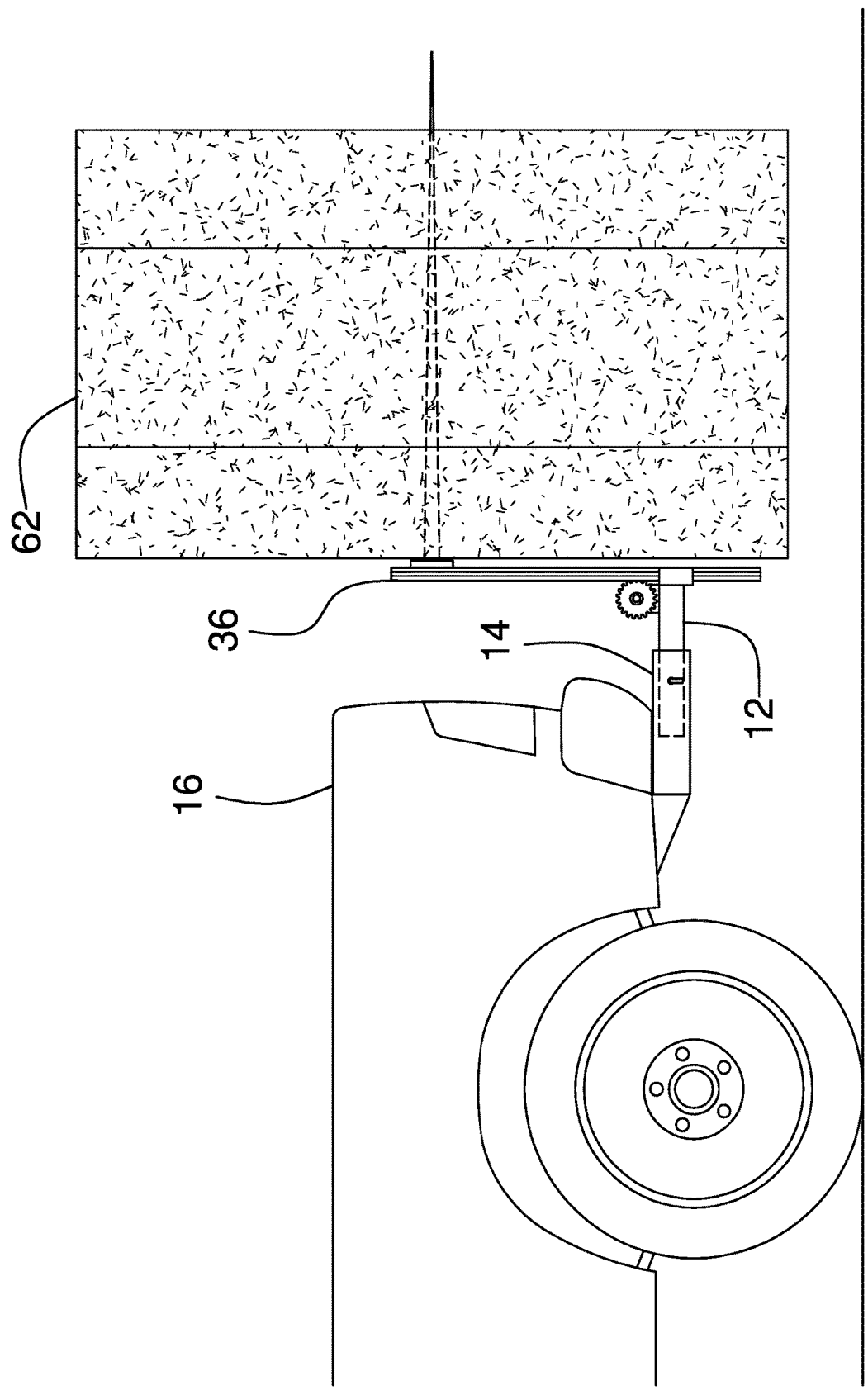
FIG. 6 is a left side in-use view of an embodiment of the disclosure.

With reference now to the drawings, and in particular to FIGS. 1 through 6 thereof, a new forklift device embodying the principles and concepts of an embodiment of the disclosure and generally designated by the reference numeral 10 will be described.

As best illustrated in FIGS. 1 through 6, the hitch mounted forklift assembly 10 generally comprises a primary member 12 that is insertable into a hitch receiver 14 of a truck 16. The truck 16 may be a pickup truck and the hitch receiver 14 may be a hitch receiver of any conventional design. The primary member 12 has a primary end 18 and a secondary end 20, and the primary end 18 is insertable into the hitch receiver 14. A coupler 22 is coupled to the primary member 12 and the coupler 22 is exposed when the primary member 12 is positioned in the hitch receiver 14.

The coupler 22 comprises a panel 24 that has a first lateral edge 26, a second lateral edge 28 and a rear surface 30 extending therebetween, and the rear surface 30 is coupled to the secondary end 20 of the primary member 12. A pair of legs 32 is each coupled to and extends away from the panel 24. Each of the legs 32 is aligned with a respective one of the first lateral edge 26 or the second lateral edge 28. A pair of feet 34 is each coupled to and extends away from a respective one of the legs 32. The feet 34 are directed toward each other and each of the feet 34 is spaced from the panel 24.

A lifting rail 36 is provided that has a track gear 38 integrated therein. The lifting rail 36 is slidably positioned in the coupler 22 and the lifting rail 36 is vertically oriented when the primary member 12 is inserted into the hitch receiver 14. The lifting rail 36 has a first surface 40, a second surface 42, a first end 44, a second end 46, a first lateral edge 48 and a second lateral edge 50. The lifting rail 36 is elongated between the first end 44 and the second end 46 of the lifting rail 36. Each of the first lateral edge 48 and the second lateral edge 50 has a slot 52 extending inwardly therein and extending between the first end 44 and the second end 46 of the lifting rail 36.

The track gear 38 is centrally positioned on the first surface 40 and the track gear 38 extends between the first end 44 and the second end 46 of the lifting rail 36. Each of the feet 34 on the coupler 22 engages the slot 52 in a respective one of the first lateral edge 48 or the second lateral edge 50 of the lifting rail 36. In this way the lifting rail 36 is slidably retained in the coupler 22. A motor 53 is coupled to the primary member 12 and the motor 53 has a power cord 54 extending outwardly therefrom for connecting to a power source. The motor 53 rotates in a first direction or a second direction when the motor 53 is turned on.

A drive gear 54 is rotatably coupled to the motor 53 such that the motor 53 rotates the drive gear 54 when the motor 53 is turned on. The drive gear 54 engages the track gear 38 in the lifting rail 36. Thus, the lifting rail 36 is lifted upwardly by the drive gear 54 when the motor 53 rotates in the first direction. Conversely, the lifting rail 36 is lowered downwardly by the drive gear 54 when the motor 53 rotates in the second direction. The motor 53 may be an electric motor or the like and the motor 53 may include a radio frequency receiver. A remote control 56 may be provided that is in wireless electrical communication with the radio frequency receiver in the motor 53 for remotely lifting and lowering the lifting rail 36.

A cross member 58 is coupled to the lifting rail 36 and the cross member 58 is horizontally oriented when the primary member 12 is inserted into the hitch receiver 14. The cross member 58 is coupled to the second surface 42 of the lifting rail 36 and the cross member 58 is centrally positioned between the first end 44 and the second end 46. A plurality of tines 60 is provided and each of the tines 60 is coupled to and extends away from the cross member 58. Each of the tines 60 is horizontally oriented when the primary member 12 is inserted into the hitch receiver 14 to pierce a hay bale 62.

The plurality of tines 60 is lifted when the lifting rail 36 is lifted to lift the hay bale 62 for transport. Conversely, the plurality of tines 60 is lowered when the lifting rail 36 is lowered to lower the hay bale 62. The tines 60 are spaced apart from each other and are distributed along the cross member 58. The plurality of tines 60 includes a central tine 64 and a pair of outward tines 66. The central tine 64 has a length that is greater than the length of each of the outward tines 66. As is most clearly shown in FIG. 1, a slow moving vehicle sign 68 is provided that includes a pair of straps 70. The cross member 58 has a pair of strap slots 72 extending therethrough for receiving a respective one of the straps 70. In this way the slow moving vehicle sign 68 can be placed on the back of the hay bale 62 for alerting traffic that approaches the truck 16 from behind.

In use, the primary member 12 is inserted into the hitch receiver 14 and the power cord 54 for the motor 53 is plugged into the power source. The motor 53 is turned on to position the plurality of tines 60 to a selected height and the truck 16 is driven backwards to drive the tines 60 into the hay bale 62. The motor 53 is turned on to lift the plurality of tines 60 thereby facilitating the truck 16 to transport the hay bale 62. The motor 53 is turned on the lower the plurality of tines 60 when the truck 16 reaches a destination for the hay bale 62 and subsequently sit the hay bale 62 down. The truck 16 is driven forwardly away from the hay bale 62 and the process is repeated for additional hay bales.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hitch mounted forklift assembly for mounting on a tow hitch of a truck for lifting hay bales, said assembly comprising:

a primary member being insertable into a hitch receiver of a truck, said primary member having a first end and a second end;

a coupler being coupled to said primary member, said coupler being exposed when said primary member is positioned in the tow hitch, said coupler comprising a panel having a first lateral edge, a second lateral edge and a rear surface extending therebetween, said rear surface being coupled to said second end of said primary member;

a lifting rail having a track gear being integrated therein, said lifting rail being slidably positioned in said coupler having said lifting rail being vertically oriented when said primary member is inserted into the tow hitch;

a motor being coupled to said primary member;

a drive gear being rotatably coupled to said motor such that said motor rotates said drive gear when said motor is turned on, said drive gear engaging said track gear in said lifting rail, said lifting rail being lifted upwardly or lowered downwardly by said drive gear when said motor rotates said drive gear;

a cross member being coupled to said lifting rail, said cross member being horizontally oriented when said primary member is inserted into the tow hitch;

a plurality of tines, each of said tines being coupled to and extending away from said cross member, each of said tines being horizontally oriented when said primary member is inserted into the tow hitch wherein each of said tines is configured to pierce a hay bale, said plurality of tines being lifted when said lifting rail is lifted wherein said plurality of tines is configured to lift the hay bale for transport, said plurality of tines being lowered when said lifting rail is lowered wherein said plurality of tines is configured to lower the hay bale;

a pair of legs, each of said legs being coupled to and extending away from said panel, each of said legs being aligned with a respective one of said first lateral edge or said second lateral edge;

a pair of feet, each of said feet being coupled to and extending away from a respective one of said legs, said feet being directed toward each other, each of said feet being spaced from said panel; and wherein said lifting rail has a first surface, a second surface, a first end, a second end, a first lateral edge and a second lateral edge, said lifting rail being elongated between said first end and said second end, each of said first lateral edge and said second lateral edge having a slot extending inwardly therein and extending between said first end and said second end, each of said feet on said coupler engaging said slot in a respective one of said first lateral edge or said second lateral edge of said lifting rail such that said lifting rail is slidably retained in said coupler.

2. The assembly according to claim 1, further comprising said first end of said primary member being insertable into the hitch receiver.

3. The assembly according to claim 1, wherein said track gear is centrally positioned on a first surface of said lifting rail, said track gear extending between a first end and a second end of said lifting rail.

4. The assembly according to claim 1, wherein said motor has a power cord extending outwardly therefrom wherein said power cord is configured to be connected to a power source, said motor rotating in a first direction or a second direction when said motor is turned on.

5. The assembly according to claim 4, wherein said lifting rail is lifted upwardly by said drive gear when said motor rotates in said first direction, said lifting rail being lowered downwardly by said drive gear when said motor rotates in said second direction.

6. The assembly according to claim 1, wherein said cross member is coupled to said second surface of said lifting rail, said cross member being centrally positioned between said first end and said second end.

7. A hitch mounted forklift assembly for mounting on a tow hitch of a truck for lifting hay bales, said assembly comprising:

a primary member being insertable into a hitch receiver of a truck, said primary member having a first end and a second end, said first end being insertable into the hitch receiver;

a coupler being coupled to said primary member, said coupler being exposed when said primary member is positioned in the tow hitch, said coupler comprising:

a panel having a first lateral edge, a second lateral edge and a rear surface extending therebetween, said rear surface being coupled to said second end of said primary member;

a pair of legs, each of said legs being coupled to and extending away from said panel, each of said legs being aligned with a respective one of said first lateral edge or said second lateral edge; and a pair of feet, each of said feet being coupled to and extending away from a respective one of said legs, said feet being directed toward each other, each of said feet being spaced from said panel;

a lifting rail having a track gear being integrated therein, said lifting rail being slidably positioned in said coupler having said lifting rail being vertically oriented when said primary member is inserted into the tow hitch, said lifting rail having a first surface, a second surface, a first end, a second end, a first lateral edge and a second lateral edge, said lifting rail being elongated between said first end and said second end, each of said first lateral edge and said second lateral edge having a slot extending inwardly therein and extending between said first end and said second end, said track gear being centrally positioned on said first surface, said track gear extending between said first end and said second end, each of said feet on said coupler engaging said slot in a respective one of said first lateral edge or said second lateral edge of said lifting rail such that said lifting rail is slidably retained in said coupler;

a motor being coupled to said primary member, said motor having a power cord extending outwardly therefrom wherein said power cord is configured to be connected to a power source, said motor rotating in a first direction or a second direction when said motor is turned on;

a drive gear being rotatably coupled to said motor such that said motor rotates said drive gear when said motor is turned on, said drive gear engaging said track gear in said lifting rail, said lifting rail being lifted upwardly by said drive gear when said motor rotates in said first direction, said lifting rail being lowered downwardly by said drive gear when said motor rotates in said second direction;

a cross member being coupled to said lifting rail, said cross member being horizontally oriented when said primary member is inserted into the tow hitch, said cross member being coupled to said second surface of said lifting rail, said cross member being centrally positioned between said first end and said second end; and a plurality of tines, each of said tines being coupled to and extending away from said cross member, each of said tines being horizontally oriented when said primary member is inserted into the tow hitch wherein each of said tines is configured to pierce a hay bale, said plurality of tines being lifted when said lifting rail is lifted wherein said plurality of tines is configured to lift the hay bale for transport, said plurality of tines being lowered when said lifting rail is lowered wherein said plurality of tines is configured to lower the hay bale, said tines being spaced apart from each other and being distributed along said cross member.

\* \* \* \* \*